US012200574B2

(12) United States Patent
Reeves (10) Patent No.: US 12,200,574 B2
(45) Date of Patent: Jan. 14, 2025

(54) DYNAMIC TRACING IN WIRELESS COMMUNICATION NETWORKS

(71) Applicant: T-MOBILE INNOVATIONS LLC, Overland Park, KS (US)

(72) Inventor: Raymond Emilio Reeves, Orlando, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 446 days.

(21) Appl. No.: 17/837,284

(22) Filed: Jun. 10, 2022

(65) Prior Publication Data
US 2023/0403532 A1    Dec. 14, 2023

(51) Int. Cl.
*H04L 43/10*      (2022.01)
*H04W 4/029*     (2018.01)
*H04W 24/08*     (2009.01)

(52) U.S. Cl.
CPC ............. *H04W 4/029* (2018.02); *H04L 43/10* (2013.01); *H04W 24/08* (2013.01)

(58) Field of Classification Search
CPC ...... H04L 43/10; H04W 24/08; H04W 4/029; H04W 4/02
USPC ...................................................... 455/456.1
See application file for complete search history.

(56) References Cited

U.S. PATENT DOCUMENTS

| | | | |
|---|---|---|---|
| 2021/0081271 A1* | 3/2021 | Doshi ..................... | G06F 21/53 |
| 2022/0053355 A1* | 2/2022 | Stjernholm ........... | H04W 48/08 |
| 2023/0153224 A1* | 5/2023 | Liu ..................... | G06F 11/3466 |
| | | | 714/45 |
| 2023/0231793 A1* | 7/2023 | Zdobylak ............... | H04L 49/90 |
| | | | 370/241 |

FOREIGN PATENT DOCUMENTS

WO    WO-2023232227 A1 * 12/2023

* cited by examiner

*Primary Examiner* — Hirdepal Singh
(74) *Attorney, Agent, or Firm* — Shook, Hardy & Bacon L.L.P.

(57) ABSTRACT

Methods, media, and systems are provided for dynamic session trace management for user equipment (UE). For example, a first node is identified for a first UE, the first node being associated with a default trace processor. In some embodiments, the first node is identified based on a setup communication with the first UE. A trace profile for the first UE may generated. The trace profile may indicate a primary trace processor for the first UE. Based on the default trace processor of the first node being different than the primary trace processor, the first node is instructed to utilize the primary trace processor for trace reports associated with the first UE. In some embodiments, the primary trace processor may identify a location for the first UE using the trace reports. The trace reports may be received from a plurality of nodes and maintained by the primary trace processor.

20 Claims, 5 Drawing Sheets

DYNAMIC TRACING IN WIRELESS COMMUNICATION NETWORKS

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for dynamic session trace management of user equipment, substantially as shown in and/or described in connection with at least one of the figures, and as set forth more completely in the claims.

In aspects set forth herein, and at a high level, the systems and methods identify one or more nodes (e.g., an evolved node base station, a next generation base station, another type of access node, or a combination thereof) associated with a first user equipment (UE). In some embodiments, the one or more nodes are identified based on a trigger, such as a setup between the first UE and the one or more nodes for example. Continuing the example, the trigger may additionally or alternatively involve a setup between the one or more nodes and network control node (e.g., a mobility management entity). In some embodiments, the trigger includes receiving, from the first UE, identification data for the one or more nodes that have provided a communication service to the first UE.

Further, a trace profile may be requested for the first UE from a profile store. In some embodiments, the network control node receives the trace profile from the profile store. The trace profile may include, for example, identification data for identifying the first UE. As another example, the trace profile may include location data for the first UE (e.g., location data for the first UE associated with a first node and location data for the first UE associated with a second node). In some embodiments, the trace profile for the first UE may indicate the first UE as having a fraudulent telephone number, for example. In some embodiments, the trace profile for the first UE may indicate the first UE is associated with a user who an entity is trying to locate (e.g., a missing person or a person wanted by a state or federal entity). In some embodiments, the trace profile for the first UE may indicate the first UE is associated with a user who is a high-profile user (e.g., a government official). In some embodiments, the profile store may be stored on a cloud-distributed storage configuration, and contents of a trace profile may be stored based on the type of information (e.g., identification data for identifying UEs and the location data for the UEs).

Based on the trace profile for the first UE, an indication is provided to a first node that is associated with the first UE, the first node having a default trace processor. The indication indicates to the first node that a primary trace processor maintains trace reports for the first user equipment. Based on the indication, the primary trace processor receives, from the first node, a first trace report for the first UE. Based on receiving the first trace report, the primary trace processor may transmit the first trace report or a portion of the first trace report to a second node associated with the first UE or back to the first node at a future time. In some embodiments, the primary trace processor may process the first trace report or a portion of the first trace report and transmit the processed data to the second node or back to the first node at a future time. The primary trace processor may maintain a plurality of trace reports from a plurality of nodes associated with the first UE.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AOA Angle of Arrival
API Application Programming Interface
CA Carrier Aggregation
CD-ROM Compact Disk Read Only Memory
CDMA Code Division Multiple Access
DVD Digital Versatile Discs EEPROM Electrically Erasable Programmable Read Only Memory
eNB Evolved Node B
Ev-DO Evolution-Data Optimized
FD-MIMO Full-Dimension Multiple-Input Multiple-Output
gNB Next Generation Node B
GPRS General Packet Radio Service
GSM Global System for Mobile communications
HSS Home Subscriber System
IEEE Institute of Electrical and Electronics Engineers
LTE Long Term Evolution
MAC Media Access Control
MIMO Multiple-Input Multiple-Output
MME Mobility Management Entity
MU-MIMO Multi-User Multiple-Input Multiple-Output
NR New Radio
OTDOA Observed Time Difference of Arrival
PC Personal Computer
PDA Personal Digital Assistant
RAM Random Access Memory
RAN Radio Access Node
RF Radio-Frequency
ROM Read Only Memory
RRC Radio Resource Control
RRU Remote Radio Unit
RSRP Reference Transmission Receive Power
RSRQ Reference Transmission Receive Quality
RSSI Received Signal Strength Indicator
RTT Round-Trip Time
TDMA Time Division Multiple Access
TOA Time of Arrival
UE User Equipment
VoNR Voice over NR
VoLTE Voice over LTE
WiMAX Worldwide Interoperability for Microwave Access In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Further, the term "some" may refer to "one or more." Additionally, an element in the singular may refer to "one or more." The term "combination" (e.g., a combination thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Additionally, a "user equipment" (UE), as used herein, is a device that has the capability of using a wireless communications network, and may also be referred to as a "computing device," "mobile device," "user device," or "wireless communication device." A UE, in some aspects, may take on a variety of forms, such as a PC, a laptop computer, a tablet, a mobile phone, a PDA, a server, any other device capable of communicating with other devices (e.g., by transmitting or receiving a signal) using a wireless communication, or a combination thereof. A UE may be, in an embodiment, similar to UEs 104A and 104B described herein with respect to FIG. 2; UEs 204A and 204B described herein with respect to FIG. 2; or UE 302 described herein with respect to FIG. 3. A UE may also be, in another embodiment, similar to UE 500, described herein with respect to FIG. 5.

A UE may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or a combination thereof. Internet-of-things devices may be stationary, mobile, or both. In some embodiments, the UE is associated with a vehicle (e.g., a video system in a car capable of receiving media content stored by a media device in a house when coupled to the media device via a local area network). In some embodiments, the UE comprises a medical device, a location monitor, a clock, other wireless communication devices, or a combination thereof.

In embodiments, a UE discussed herein may be configured to communicate using one or more of 4G (e.g., LTE), 5G, 6G, another generation communication system, or a combination thereof. In some aspects, the UE has a radio that connects with a 4G cell site but is not capable of connecting with a higher generation communication system. In some aspects, the UE has components to establish a 5G connection with a 5G gNB, and to be served according to 5G over that connection. In some aspects, the user device may be an E-UTRAN New Radio—Dual Connectivity (ENDC) device. ENDC allows a user device to connect to an LTE eNB that acts as a master node and a 5G gNodeB that acts as a secondary node. As such, in these embodiments, the ENDC device may access both LTE and 5G simultaneously, and in some cases, on the same spectrum band.

The term "trigger," as used herein, may include a signal, a request, a condition, a determination, a message, a response, another type of signal, or a combination thereof, for identifying a node associated with a UE or for identifying a UE associated with a particular node. For example, a trigger may involve a connection request transmitted by a UE to a node. As another example, the trigger may involve a detection (e.g., by a server) that a new access node has been added to the network. In yet another example, the trigger may involve signals associated with reallocation of network resources for an access node (e.g., a reconfiguration of a network connection between a UE and the access node, the UE and a relay node, between the relay node and the access node, or a combination thereof).

At a high level, the term "trace processor" refers to a computing component for processing trace cache (e.g., a trace is a dynamic instruction sequence constructed and cached by hardware). Trace cache, for example, may store previously fetched and decoded traces. The trace processor may process an instruction cache at the trace level. A trace may comprise a maximum number of instructions and a maximum basic blocks (e.g., associated with branch predictions). A trace processor may be configured to control flow or data flow hierarchy for managing architectural logic. For example, a trace processor may distribute resources based on a trace boundary. As another example, a trace processor may apply control or data prediction at a trace level instead of at a branch level.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior methods and systems fail to provide dynamic session trace management for UEs. For example, the default processor of one node within prior systems fail to communicate with other default processors of other nodes. To illustrate, a UE may move from one coverage area of a first node to a second coverage area of a second node (e.g., the UE is turned off for a flight and is subsequently turned on after landing). The default processor of the second node providing telecommunication services to the UE does not have any information associated with the communications between the UE and the first node. As such, if a controller requests data from the first node, the first node would not be able to provide the requested data that is associated with communications between the UE and the second node to the controller. Similarly, if the controller requests data from the second node, the second node would not be able to provide the requested data that is associated with communications between the UE and the first node to the controller. For example, if a law enforcement agency attempts to locate someone, prior methods and systems involve using a call trace associated with a particular phone number. The call trace does not result in identifying data associated with a communication session between the UE and one or more nodes, since default trace processors are statically assigned to one or more nodes.

The technology discussed herein can alleviate the problems and shortcomings discussed above. For instance, embodiments disclosed herein provide for dynamic session trace management for user equipment. For example, a method comprises identifying a first node corresponding to a first user equipment, wherein the first node is associated with a default trace processor. Additionally, the method comprises requesting, from a profile store, a trace profile for the first user equipment, the trace profile indicating a primary trace processor for the first user equipment. Further, based at least in part on the trace profile for the first user equipment, it is determined that the primary trace processor is different than the default trace processor of the first node. The first node is instructed to utilize the primary trace processor for trace reports associated with the first user equipment such that the primary trace processor can maintain a master set of trace reports for the first user equipment for locating the first user equipment.

In another aspect, a dynamic session trace management system is provided. The system may comprise one or more processors and computer memory storing computer-usable instructions that, when executed by the one or more processors. The operations may comprise requesting a trace profile for a first user equipment, the trace profile stored at a profile store. Based on the trace profile for the first user equipment, an indication is provided to a first node having a default trace processor that a primary trace processor maintains trace reports for the first user equipment. A first trace report for the first user equipment is received at the primary trace processor and from the first node for transmission by the primary trace processor to a second node or back to the first node at a future time.

In yet another aspect, non-transitory computer-readable media having computer-usable instructions are provided. The computer-usable instructions are embodied on the non-transitory computer-readable media. Additionally, when executed by a processor, the computer-usable instructions perform operations for dynamic session trace management for user equipment. The operations comprise identifying a first node that is most frequently used by a first user equipment, the first node associated with a first trace processor. Additionally, a second node associated with the first user equipment is also identified, the second node being associated with a second trace processor. The first node and the second node are instructed to utilize a primary trace processor that manages trace reports corresponding to the first user equipment. Based on instructing the first node and the second node, the primary trace processor receives a trace report from the first node or the second node for the first user equipment.

Figure 1:
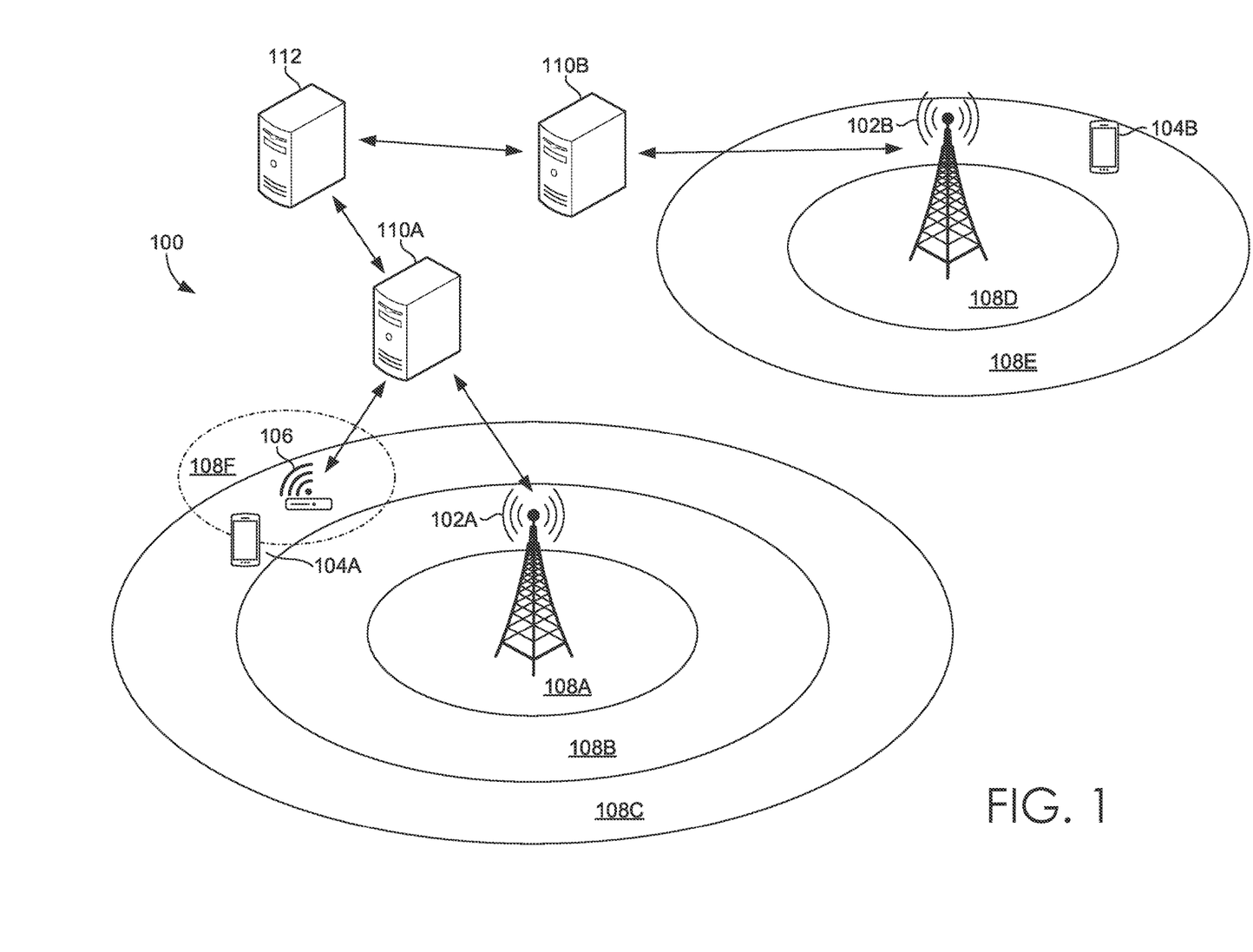
FIG. 1 depicts an example environment for dynamic session trace management for user equipment, in accordance with aspects herein.

Turning now to FIG. 1, example environment 100 comprises a first cell site 102A and a second cell site 102B, a first user equipment 104A and a second user equipment 104B, distributed station 106, frequency regions 108A-108F, a first trace processor 110A and a second trace processor 110B, and primary trace processor 112. Example environment 100 is but one example of a suitable environment for dynamic tracing in a wireless communication network, and is not intended to suggest any limitation as to the scope of use or functionality of the invention. Neither should the environment 100 be interpreted as having any dependency or requirement relating to any one or combination of components illustrated.

As depicted by example environment 100, the first cell site 102A may wirelessly communicate with the first user equipment 104A located within the frequency region 108C to provide the first user equipment 104A with one or more communication services. In other embodiments, the first user equipment 104A may be located within the frequency region 108A or frequency region 108B. The one or more communication services may include, for example, the transfer of information without the use of an electrical conductor as the transferring medium. A wireless communication service may correspond to the transfer of information via radio waves (e.g., Bluetooth®), satellite communication, infrared communication, microwave communication, Wi-Fi, millimeter wave communication, mobile communication, another type of communication, or a combination thereof. In embodiments, the communication service may include one or more of a voice service, a message service (e.g., SMS messages, MMS messages, instant messaging messages, an EMS service messages), a data service, other types of wireless telecommunication services, or a combination thereof. In embodiments, the one or more communication services may be provided by one or more communication providers. For example, user equipment 104A may correspond to a user who is registered or subscribed to a communication service provider to utilize one or more communication services.

The first cell site 102A may wirelessly communicate with the first user equipment 104A using one or more of 3G, 4G, 5G, 6G, another generation communication system, 802.11, millimeter waves, FD-MIMO, massive MIMO, MU-MIMO, cooperative MIMO, another type of communication system, or a combination thereof. Additionally, other wireless communication protocols may be utilized in conjunction with aspects described herein. For example, embodiments of the present technology may be used with one or more wireless communication protocols or standards, including, but not limited to, CDMA 1×Advanced, GPRS, Ev-DO, TDMA, GSM, WiMAX technology, LTE, LTE Advanced, other technologies and standards, or a combination thereof.

As used herein, the term "cell site" generally refers to one or more cellular base stations, nodes, RRUs control components, other components configured to provide a wireless interface between a wired network and a wirelessly connected user device, or a combination thereof. A cell site may comprise one or more nodes (e.g., eNB, gNB, and the like) that are configured to communicate with user devices. In some aspects, the cell site may include one or more band pass filters, radios, antenna arrays, power amplifiers, transmitters/receivers, digital signal processors, control electronics, GPS equipment, other equipment, or a combination thereof. An eNB or gNB corresponding to the cell site may comprise one or more of a macro base station, a small cell or femtocell base station, a relay base station, another type of base station, or a combination thereof. In aspects, the cell site may be configured as FD-MIMO, massive MIMO, MU-MIMO, cooperative MIMO, 3G, 4G, 5G, 6G, another generation communication system, or a combination thereof. In addition, the cell site may operate in an extremely high frequency region of the spectrum (e.g., from 30 GHz to 300 GHz), also known as the millimeter band.

The first cell site 102A and the second cell site 102B may provide the wireless communication services via a network comprising one or more telecommunication networks, or a portion thereof. A telecommunication network might include an array of devices or components (e.g., one or more cell sites). The network can include multiple networks, and the network can be a network of networks. In embodiments, the network is a core network, such as an evolved packet core, which may include at least one MME, at least one serving gateway, and at least one Packet Data Network gateway. The MME may manage non-access stratum (e.g., control plane) functions such as mobility, authentication, and bearer management for other devices associated with the evolved packet core.

In some aspects, a network can connect one or more UEs to a corresponding immediate service provider for services such as 5G and LTE, for example. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or a combination thereof.

Components of the network, such as terminals, links, and nodes (as well as other components), can provide connectivity in various implementations. For example, components of the network may include core network nodes, relay devices, integrated access and backhaul nodes, macro eNBs, small cell eNBs, gNBs, relay cell sites, other network components, or a combination thereof. The network may interface with one or more cell sites through one or more wired or wireless backhauls. As such, the one or more cell sites may communicate to devices via the network or directly. Furthermore, user devices can utilize the network to communicate with other devices (e.g., a user device(s), a server(s), etc.) through the one or more cell sites.

The distributed station 106 may be partially or fully within a coverage area of the first cell site 102A. As illustrated in example environment 100, the distributed station 106 is located within frequency region 108C. In other embodiments, the frequency region 108C may be located within frequency region 108B. In some embodiments, the distributed station 106 may be partially within frequency region 108C and partially within frequency region 108B. In some embodiments, the coverage area of the second cell site 102B comprises a distributed station.

The distributed station 106 may comprise one or more small cells. In some embodiments, the distributed station 106 comprises a cluster of small cells. In some embodiments, the distributed station 106 includes two or more distributed servers across a 5G core network for integration of an internet service and a cloud-based service to reduce latency and improve response times. In some embodiments, the distributed station 106 is located in an indoor environment (e.g., for implementing Wi-Fi 6—IEEE 802.11ax). In some embodiments, distributed station 106 may provide for coverage area beyond the coverage area of the first cell site 102A, such that the distributed station 106 allows for a communication service to be provided to a UE located within the frequency region 108F.

The first trace processor 110A and the second trace processor 110B provide trace reports, associated with one or more of the first UE 104A, the second UE 104B, or another UE, to the primary trace processor 112. For example, the trace reports are provided to the primary processor (e.g., for storage at one or more databases) in response to the first trace processor 110A and the second trace processor 110B receiving an indication that the primary trace processor 112 maintains trace reports for the first UE 104A, the second UE 104B, or the other UE. In some embodiments, the trace reports are provided to the primary processor in response to the first cell site 102A and the second cell site 102B receiving the indication.

A trace report provided by the first cell site 102A may comprise trace report data including identifying information corresponding to the first cell site 102A (e.g., data associated with baseband hardware, radio hardware, controller hardware, router hardware, switch hardware, antenna hardware, amplifier hardware, a location associated with the first cell site 102A, etc.), identifying information corresponding to the first trace processor 110A, identifying information corresponding to the distributed station 106 (e.g., a destination address for each of the cluster of small cells), identifying information corresponding to the first UE 104A (e.g., a device identifier, an operating system identifier, etc.), or a combination thereof.

The trace report data may also include location data for the first UE 104A. For example, the location data may be obtained using MIMO communication, Bluetooth Low Energy protocol, radio frequency signaling, and other communication technologies. In some embodiments, trace report data may include a distance between the first UE 104A and another associated device (e.g., an electronic vehicle, a smartwatch, etc.). The distance may be determined, for example, by using a Bluetooth Low Energy beacon radio signal strength identifier over time or an inertial measurement unit change. In some embodiments, trace report location data for the first UE 104A may include one or more of a latitude, a longitude, an elevation or altitude, or a combination thereof. The elevation or altitude may be determined using altimeter, for example. Further, the location data may include an associated timestamp.

The location data may include GPS location data, Wi-Fi location data, manually-entered location data, or a combination thereof. The location data may be obtained via triangulation of an RSSI received by the first cell site 102A, an RSSI received by a Wi-Fi router, an RSSI received by the distributed station 106, or a combination thereof. In some embodiments, the location data is obtained using GPS satellite triangulation, Bluetooth triangulation, other triangulation techniques (e.g., using two or more gNBs), or a combination thereof. The location data may also include a distance between an antenna associated with the first cell site 102A and the first UE 104A, a measured time difference between reference signals transmitted by the first cell site 102A, or a combination thereof. In aspects, the location data may be a set of coordinates relative to a known location defined by geographic or civic (e.g., a postal address) terms.

In embodiments, the first cell site 102A may determine the location of the first UE 104A by using a 5G network (e.g., NG Radio Access Networking and a 5G Core Network) and OTDOA positioning. In some embodiments, the location data is determined using a Global Navigation Satellite System satellite vehicle. In some embodiments, the location data is determined using position reference signals transmitted by the first cell site 102A. In some embodiments, the location data is determined based on a combination of one or more of GPS coordinates, propagation times, signal strengths, directional information associated with a beam of the first cell site 102A, and so forth.

In some aspects, the location data is determined by a server based on UE reported location measurements. For example, the server may store antenna location information, radio beam direction information, antenna pattern information, bound geographic area information, other location information associated with a cell or radio beam corresponding to the first cell site 102A, or a combination thereof. In some embodiments, the server determines the location of the first UE 104A based on location measurements received from the first cell site 102A or the first UE 104A. For example, the location measurements may comprise RSSI, RTT, RSRP, RSRQ, AOA, TOA, other signals transmitted by the first UE 104A, or a combination thereof.

Further, the trace report data may include a phone number associated with the first UE 104A, a location accuracy determination for the location data of the first UE 104A, an identified home or work address for the first UE 104A, a location history of the first UE 104A, other trace report data, or a combination thereof. In some embodiments, the trace report data may include network selection data. For example, the network selection data may include a list of preferred networks (e.g., user-preferred or operator-preferred), a list of blocked networks, a list of networks that refused a connection request, a home network, a signal quality for a particular network, or a combination thereof. As another example, the network selection data may include data associated with a connection request.

The primary trace processor 112 may receive a plurality of trace reports for the first UE 104A from the first trace processor 110A. In some embodiments, the primary trace processor 112 may receive one or more trace reports for the first UE 104A from the second trace processor 110B in response to the first UE 104A moving within the frequency region 108D or the frequency region 108E. Additionally, the primary trace processor 112 may receive a plurality of trace reports for the second UE 104B from the second trace processor 110B. In some embodiments, the primary trace processor 112 may receive one or more trace reports for the second UE 104B from the second trace processor 110B in response to the second UE 104B moving within frequency region 108A, frequency region 108B, frequency region 108C, or the frequency region 108F. Additionally, the primary trace processor 112 may transmit trace reports, received by the first trace processor 110A, to the second trace processor 110B. The primary trace processor 112 may also transmit trace reports, received by the second trace processor 110B, to the first trace processor 110A.

Figure 2:
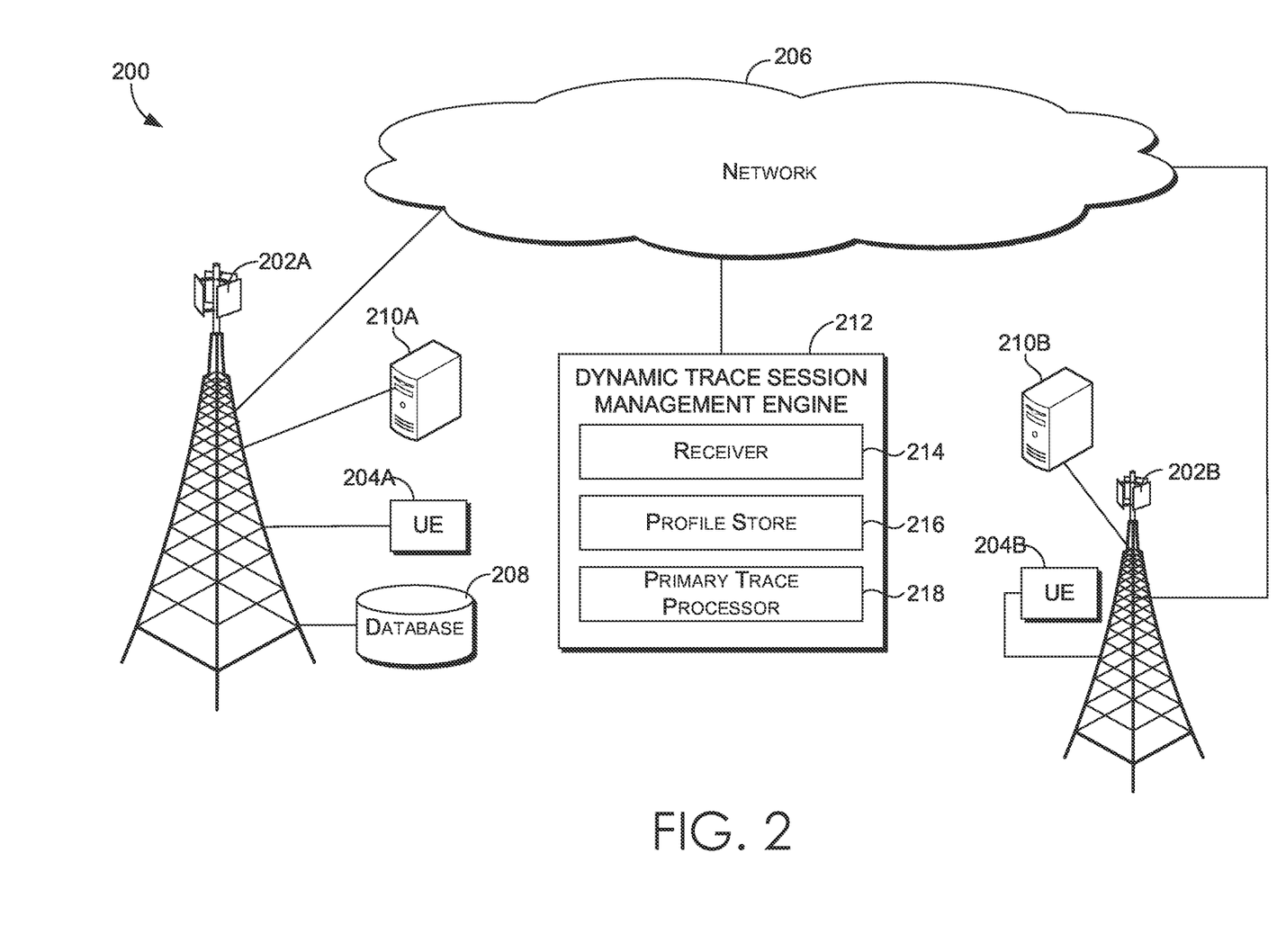
FIG. 2 illustrates an example environment for a dynamic session trace management system, in accordance with aspects herein.

FIG. 2 depicts example environment 200 comprising a first cell site 202A corresponding to a first user device 204A, a first database 208, and a first default trace processor 210A; a second cell site 202B corresponding to a second user device 204B and a second default trace processor 210B. In some embodiments, example environment 200 also comprises one or more additional cell sites each having a respective default trace processor. As depicted in example environment 200, network 206 allows for the first cell site 202A and the second cell site 202B to be communicatively coupled to dynamic trace session management engine 212. The dynamic trace session management engine 212 comprises a receiver 214, a profile store 216, and a primary trace processor 218. In some embodiments, the dynamic trace session management engine 212 includes more or less of the components illustrated in example environment 200. As one example, the profile store may be a database separate from the dynamic trace session management engine 212 and communicatively coupled to the dynamic trace session management engine 212.

In some embodiments, the dynamic trace session management engine 212 identifies the first cell site 202A corresponding to the first UE 204A, wherein the first cell site 202A is associated with the first default trace processor 210A. Additionally or alternatively, the dynamic trace session management engine 212 may also identify the second cell site 202B corresponding to the second UE 204B. For example, the dynamic trace session management engine 212 may identify the first cell site 202A or the second cell site 202B based on one or more transmissions of control signals between the first cell site 202A or the second cell site 202B and an MME. As another example, the dynamic trace session management engine 212 may identify the first cell site 202A or the second cell site 202B based on an RRC protocol (e.g., based on an RRC connection request). Receiver 214 may receive data associated with the one or more transmissions of control signals between the first cell site 202A or the second cell site 202B and the MME, data associated with the RRC protocol, data associated with the RRC connection request, data corresponding to a UE associated with the one or more transmissions of control signals, data corresponding to the UE associated with the RRC protocol, other related data, or a combination thereof.

In some embodiments, the dynamic trace session management engine 212 requests a trace profile, for the first UE 204A or the second UE 204B, which is stored at profile store 216. In some embodiments, the dynamic trace session management engine 212 is implemented as a cloud-based computing environment, such as a virtual machine that operates within a computing cloud. In some embodiments, functionalities of the profile store 216 or other components of the dynamic trace session management engine 212 include a cloud-based environment such that some functions are executed in a distributed fashion. For example, the cloud-based environment may include a network of web servers having a plurality of computing devices with processor or database resources. The profile store 216 may include various functional components implemented as software, hardware, or a combination thereof. In some embodiments, the profile store 216 may include a plurality of databases (e.g., tens, hundreds, thousands, millions). Further, the profile store 216 may include a relational database, an object-relational database, another type of database, or a combination thereof.

In some embodiments, the profile store is a distributed database comprising a plurality of database sites that each have independent components. Continuing the example, each database site may comprise a plurality of computing devices, servers, or other hardware components, such that each database site is connected via a network. One example embodiment of the distributed database includes Apache Hbase™ that is accessible via a web interface or one or more APIs.

The profile store 216 may comprise a trace profile for the first UE 204A, a trace profile for the second UE 204B, and trace profiles for other UEs. A trace profile may include data associated with the corresponding UE and one or more cell sites. For example, the trace profile for the first UE 204A may include a downlink communication measurement that was measured by the first UE 204A and an uplink parameter used by the first cell site 202A corresponding to the downlink communication measurement. In an embodiment, the trace profile for the first UE 204A may include a downlink communication measurement that was measured by the first UE 204A and an uplink parameter used by another cell site corresponding to the downlink communication measurement. In some embodiments, the trace profile includes transmission reception points associated with one or more cell sites or other access points (e.g., distributed station 106 of FIG. 1).

Further, the trace profile may include a unique device identifier associated with the corresponding UE (e.g., a MAC address or another address embedded within the UE's transmissions). In some embodiments, the trace profile includes an identifier for one or more IP addresses, a default gateway, a domain name system server, or a combination thereof. In some embodiments, the trace profile may include a phone number, a serial number, an international mobile equipment identity, or a combination thereof. In some embodiments, the trace profile includes application data from a plurality of applications associated with the UE. Additionally, the trace profile may include an identifier indicative of the UE being associated with a high-profile user (e.g., a government official), an identifier indicative of the UE being associated with a fraudulent telephone number, or an identifier indicative of the UE being associated with a user who is wanted by a government entity.

In embodiments, the trace profile includes a plurality of trace reports for a particular UE from one or more cell sites. For example, the first default trace processor 210A and the second default trace processor 210B may transmit the trace reports to the dynamic trace session management engine 212 for receipt by the receiver 214. The trace profile may include organized data extracted from each trace report based on a particular category or identifier. In some embodiments, the trace profile organizes location data for a UE based on timestamps. For example, a trained natural language processing model may identify particular location data for a UE from a trace report. In some embodiments, a trace profile is organized based on a time at which each of the trace reports were received. Additionally, the trace profile may be organized based on the cell site associated with the trace report.

Based on the trace profile for the first UE, the dynamic trace session management engine 212 may provide an indication to the first cell site 202A having the first default trace processor 210A, such that the indication to the first cell site 202A indicates that the primary trace processor 218 maintains trace reports for the first UE 204A. In some embodiments, the dynamic trace session management engine 212 may provide the indication to the first cell site 202A based on identifying the first cell site 202A as corresponding to the first UE 204A (e.g., based on one or more transmissions of control signals between the first cell site 202A and an MME or based on a transmission from the first UE 204A). The dynamic trace session management engine 212 may also provide the indication (e.g., that the primary trace processor 218 maintains trace reports for the first UE 204A) to the second cell site 202B for receiving trace reports for the first UE 204A. In some embodiments, the dynamic trace session management engine 212 instructs a plurality of cell sites identified from transmissions with the MME to transmit all trace reports previously generated and all future trace reports to be generated for UEs to the primary trace processor 218.

Accordingly, the primary trace processor 218 continuously obtains and maintains trace reports for a trace profile for each UE corresponding to a trace report. In some embodiments, the dynamic trace session management engine 212 receives an instruction to identify a most recent location of the first UE 204A. Based on the instruction, the dynamic trace session management engine 212 identifies, via the primary trace processor 218, the most recent location of the first UE 204A based on the trace profile for the first UE 204A. The dynamic trace session management engine 212 may subsequently transmit data corresponding to the most recent location of the first UE 204A (e.g., a physical address, a latitude and longitude, or another type of location data) to a UE associated with the instruction to identify the most recent location of the first UE 204A.

In some embodiments, the dynamic trace session management engine 212 identifies an emergent identifier within the trace profile, the emergent identifier being indicative of the UE being associated with a fraudulent telephone number or indicative of the UE being associated with a user who is wanted by a government entity. Based on identifying the emergent identifier, the dynamic trace session management engine 212 may provide an alert to an appropriate device. In some embodiments, the dynamic trace session management engine 212 identifies a heightened indicator indicative of the UE being associated with a high-profile user (e.g., a government official). In response to identifying the heightened indicator, the dynamic trace session management engine 212 may restrict transmission of data for the high-profile user to cell sites.

For UE's without the heighted indicator, the dynamic trace session management engine 212 can transmit a trace report received from the first cell site 202A to the second cell site 202B, and trace reports received from the second cell site 202B to the first cell site 202A. In this way, the first cell site 202A and the second cell site 202B have a full scope of data associated with each user device such that the corresponding cell site is not left in the dark after a UE moves into another coverage area. For example, if the first UE 204A left the coverage area of the first cell site 202A by car and took a several hour plane ride to the coverage area of the second cell site 202B, and further established a communication session via the second cell site 202B; the second cell site 202B would have trace reports for the first UE 204A generated by the first cell site 202A that the second cell site 202B received from the primary trace processor 218. Continuing the example, the primary trace processor 218 would continue receiving trace reports from the second cell site 202B for the first UE 204A. The dynamic trace session management engine 212 could subsequently update the trace profile for the first UE 204A based on continually receiving trace reports from the second cell site 202B. As an example, the trace reports could be organized within the trace profile based on a timestamp associated with location data for each of the trace reports.

Figure 3:
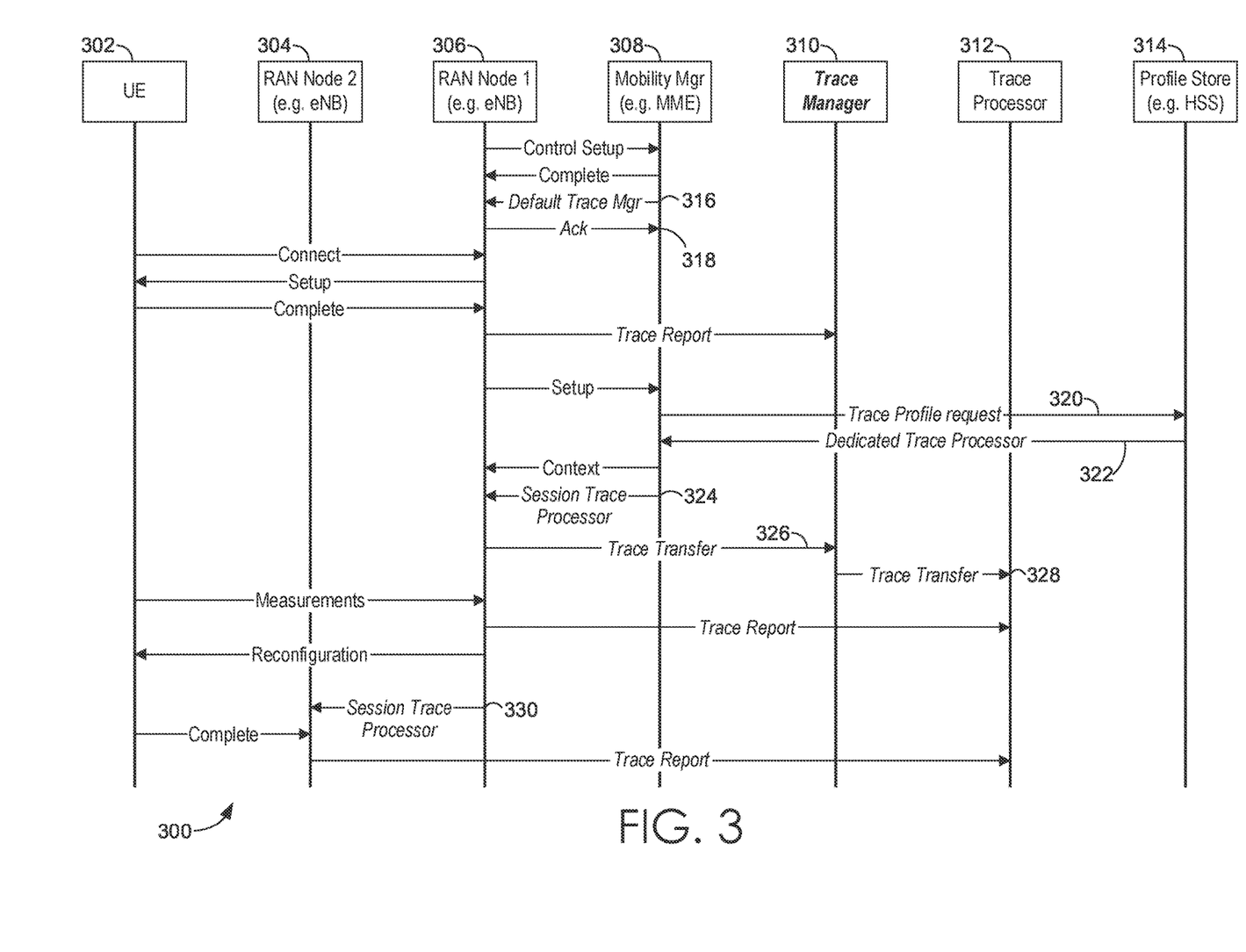
FIG. 3 depicts an example environment for dynamic session trace management for user equipment, in accordance with aspects herein.

FIG. 3 illustrates example environment 300 for dynamic session trace management for user equipment. Example environment 300 comprises UE 302, RAN Node 304, RAN Node 306, MME 308, Trace Manager 310, Trace Processor 312, and Profile Store 314. Example environment 300 is but one example of a suitable environment for dynamic tracing in a wireless communication network, and is not intended to suggest any limitation as to the scope of use or functionality of the invention. Neither should the environment 300 be interpreted as having any dependency or requirement relating to any one or combination of components illustrated.

As illustrated in example environment 300, the RAN Node 306 initiates a control setup with the MME 308 and the MME 308 completes the control setup. The RAN Node 306, in some embodiments, is the first cell site 102A or the second cell site 102B of FIG. 1. In some embodiments, the RAN Node 306 is the first cell site 202A or the second cell site 202B of FIG. 2. Additionally, the MME 308 may assist UEs with establishing 3G, 4G, 5G (e.g., an MME with 5G standalone or non-standalone architecture), 6G, or other generation sessions in a network associated with the RAN Node 306 or the RAN Node 304. The MME 308 may can also use a domain name server procedure to discover and select a serving gateway control plane or a packet data network gateway control plane, for example.

Further, at 316, MME 308 transmits an indication to the RAN Node 306 that identifies a default trace manager based on the control setup, and the RAN Node 306 acknowledges the indication at 318. Based on the indication at 316 to the RAN Node 306, the RAN Node 306 transmits a trace report to the trace manager 310. The trace report to the trace manager 310 corresponds to the UE 302 and is transmitted based on a connection setup between the UE 302 and the RAN Node 306. In some embodiments, the RAN Node 306 is a home RAN Node for the UE 302 associated with a home location for the UE 302. In some embodiments, the RAN Node 306 is a work RAN Node for the UE 302 associated with a work location for the UE 302. In some embodiments, the RAN Node 306 is a second home or a second work RAN Node for the UE 302 associated with a second home or a second work location for the UE 302. In some embodiments, the RAN Node 306 is a new RAN Node for the UE 302 associated with a new location that the UE 302 has entered.

Based on the RAN Node 306 transmitting the trace report to the trace manager 310, the MME 308 transmits a trace profile request 320 to the profile store 314. The profile store 314, in some embodiments, is an HSS. For example, the HSS may include one or more networks, one or more servers, one or more computing devices, or a combination thereof, that stores and distributes information (e.g., trace reports associated with UE 302 or other UEs, subscriber information associated with the UE 302 or other UEs). The HSS may subsequently transmit an indication to the MME 308 at 322 that indicates to the MME 308 that the trace processor 312 is the dedicated trace processor for maintaining trace reports. In some embodiments, the profile store 314 transmits the indication to a plurality of MMEs. In some embodiments, the indication 322 is specific to UE 302. In other embodiments, the indication 322 is specific to a plurality of UEs associated with RAN Node 306. In yet another embodiment, the indication 322 may instruct the MME 308 that the trace processor 312 is the dedicated trace processor for maintaining trace reports for a plurality of nodes.

Based on transmitting the indication 322 to MME 308, the MME 308 transmits a session trace processor indication 324 to the RAN Node 306. For example, the session trace processor indication 324 may correspond to tracing a current communication session between the UE 302 and the RAN Node 306. In some embodiments, the session trace processor indication 324 may further correspond to prior communication sessions between the UE 302 and the RAN Node 306. In response to transmitting the session trace processor indication 324, RAN Node 306 transmits a trace transfer 326 to the trace manager 310. The trace transfer 326 may correspond to the current communication session between the UE 302 and the RAN Node 306, one or more prior communication sessions between the UE 302 and the RAN Node 306, or a combination thereof. Based on transmitting the trace transfer 326 to the trace manager 310, the trace manager 310 transmits the trace transfer to the trace processor 312 at 328.

Additionally, based on the MME 308 receiving the indication 322 that the trace processor 312 is the dedicated trace processor for maintaining trace reports, the RAN Node 306 transmits a session trace processor indication 330 to the RAN Node 304. For example, the session trace processor indication 330 may correspond to the indication that the trace processor 312 is the dedicated trace processor for maintaining trace reports. Additionally, the session trace processor indication 330 may also correspond to a current communication session between the UE 302 and the RAN Node 304, one or more prior communication sessions between the UE 302 and the RAN Node 304, or a combination thereof.

In response to the session trace processor indication 330, RAN Node 304 transmits one or more trace reports corresponding to UE 302 to trace processor 312. In some embodiments, the trace report is associated with a current communication session between UE 302 and RAN Node 304. In some embodiments, the trace report is also associated with one or more prior communication sessions between UE 302 and RAN Node 304. The trace report may include a phone number associated with UE 302, location data associated with UE 302, a location accuracy determination for the location data, an identified home or work address for UE 302, a location history of the UE 302 during the communication session or during a prior communication session, other trace report data, network selection data (e.g., a list of preferred networks, a list of blocked networks, a list of networks that refused a connection request, a home network, a signal quality for a particular network), other communication session data (e.g., connection setup data between the UE 302 and RAN Node 304, idle mode data, etc.), or a combination thereof.

Figure 4:
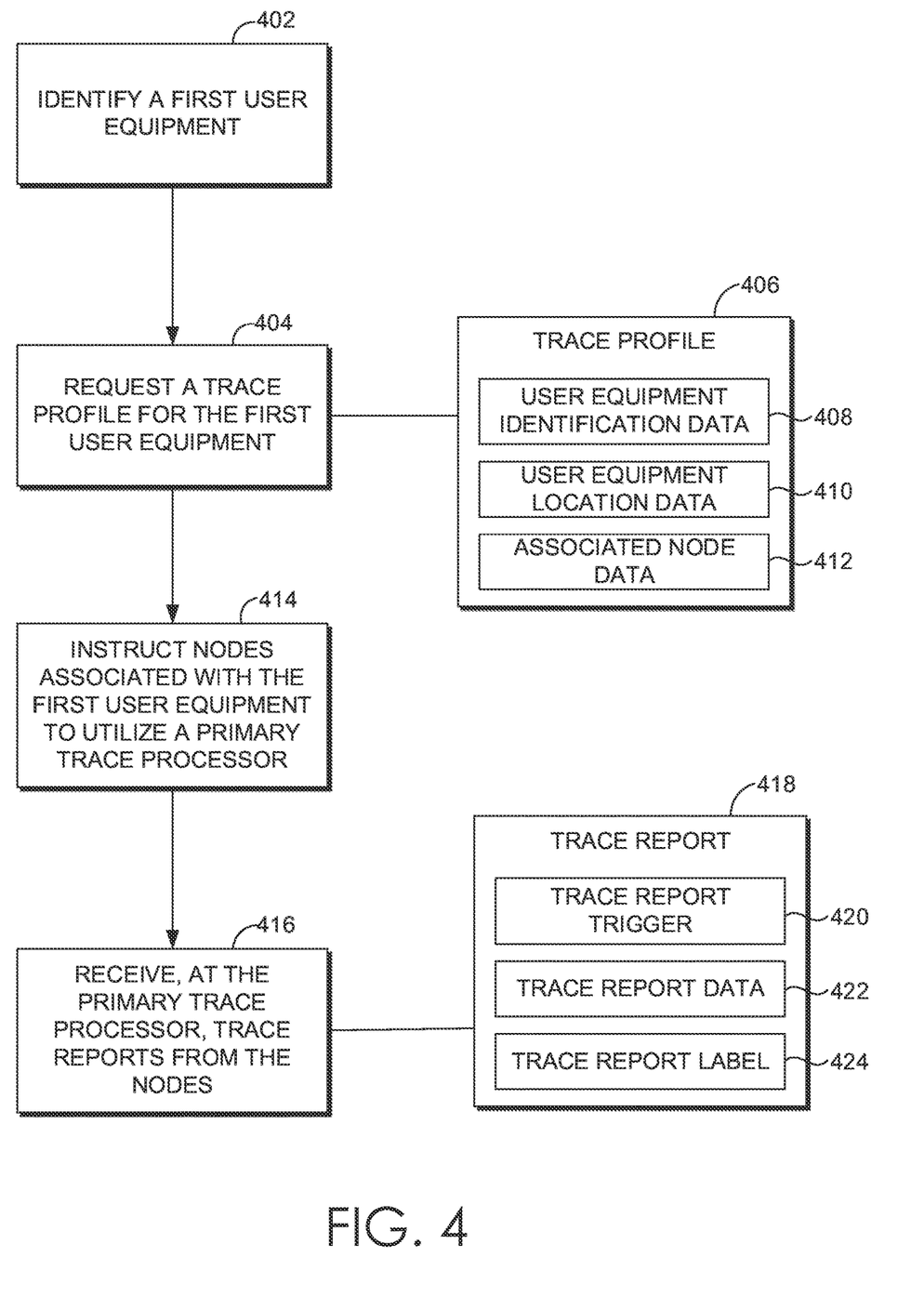
FIG. 4 depicts a flow diagram of an example method for dynamic session trace management for user equipment, in accordance with aspects herein.

FIG. 4 depicts a flow diagram of example method 400 for dynamic session trace management for user equipment. At step 402, a first user equipment is identified. The first user equipment may be identified by a first node (e.g., first cell site 102A of FIG. 1, first cell site 202A of FIG. 2, or RAN Node 306 of FIG. 3), the first node being identified based on a control setup with an MME, for example. The first UE may be identified based on a connection setup for a communication session (e.g., to access a communication service) between the first UE and the first node. In some embodiments, the first UE may be identified based on a control setup between the first node and the MME.

Based on identifying the first UE, a trace profile for the first UE is requested at 404. The trace profile may be requested by the MME, for example. In some embodiments, the trace profile is requested by the dynamic trace session management engine 212 of FIG. 2. The trace profile 406 may be stored at a profile store of one or more databases. In some embodiments, the profile store may include a plurality of databases (e.g., tens, hundreds, thousands, millions), such as one or more of a relational database, an object-relational database, another type of database, or a combination thereof. In some embodiments, the profile store is a distributed database comprising a plurality of database sites that each have independent components that are connected via a network.

The trace profile 406 may contain UE identification data 408, UE location data 410, and associated node data 412. Trace profile 406 is but one example of a trace profile, and other embodiments may be suitable for implementing the present technology. For example, in some embodiments, other data may be included.

The UE identification data 408 may include a unique device identifier associated with the first UE (e.g., a MAC address or another address embedded within the UE's transmissions). In some embodiments, the UE identification data 408 includes an identifier for one or more IP addresses of the first UE, a default gateway for the first UE, a domain name system server for the first UE, or a combination thereof. In some embodiments, the UE identification data 408 includes a phone number, a serial number, an international mobile equipment identity, or a combination thereof. In some embodiments, the trace profile includes application data from one or more applications downloaded on the UE.

The UE location data 410 may include one or more home addresses for the first UE, one or more work addresses for the first UE, one or more address of frequented locations for the first UE, a location history of the first UE, or a combination thereof. In some embodiments, UE location data 410 may include a determined distance between the first UE and another associated device (e.g., an electronic vehicle, a smartwatch, etc.), which may have been determined, for example, by using a Bluetooth Low Energy beacon radio signal strength identifier over time or an inertial measurement unit change. In some embodiments, UE location data 410 may include one or more of a latitude, a longitude, an elevation or altitude, or a combination thereof. Further, the location data may include an associated timestamp. The UE location data 410 may include GPS location data, Wi-Fi location data, manually-entered location data, or a combination thereof.

The associated node data 412 may include node data corresponding to a node that has a connection setup with the first UE or a node that previously had a connection setup with the first UE. For example, the associated node data 412 may include a downlink communication measurement that was measured by the first UE, an uplink parameter corresponding to an uplink transmitted by the associated node, or a combination thereof. In some embodiments, the associated node data 412 includes transmission reception points associated with the first node and the first UE. Further, the associated node data 412 may include data identifying a particular node.

In some embodiments, trace profile 406 includes session data corresponding to communication sessions between the first user equipment and a plurality of nodes. For example, the session data may correspond to a communication service utilized by the UE and facilitated by one of the nodes. In some embodiments, the UE identification data 408, UE location data 410, associated node data 412, or a combination thereof is extracted from session data corresponding to a communication session. In some embodiments, the communication session is associated with a communication setup or a UE idle mode.

Based at least in part on the trace profile for the first user equipment, the dynamic trace session management engine 212 of FIG. 2 or the MME 308 of FIG. 3, for example, may determine that the default trace processor of the first node is different than a primary trace processor designated for maintaining a master set of trace reports. Based at least in part on this determination, the first node is instructed at 414 to utilize the primary trace processor for trace reports associated with the first UE, such that the primary trace processor can maintain the master set of trace reports for the first user equipment for locating the first user equipment. For example, the first node may receive an indication to utilize the primary trace processor for trace reports from the MME or from another node. In some embodiments, the first node may receive an indication to utilize the primary trace processor for trace reports for a plurality of UEs. As such, based on the indication, at 416 the primary trace processor receives one or more trace reports 418 from the first node.

Further, at 414, one or more additional indications, to utilize the primary trace processor for trace reports associated with the first UE or the plurality of UEs, are transmitted to one or more other nodes associated with the first UE or the plurality of UEs (e.g., the nodes being identified for the additional indication based on the associated node data 412 of the trace profile 406 for the first UE or the trace profile 406 for each of the plurality of UEs. As such, based on the one or more additional indications, at 416 the primary trace processor receives one or more trace reports 418 from the one or more other nodes associated with the first UE or the plurality of UEs.

As an example, each of the plurality of nodes identified as corresponding to the first UE or one of the plurality of UEs may each have an associated session trace processor for individual communication sessions corresponding to a UE and the respective node. Each session trace processor is different from the primary trace processor that maintains the master set of trace reports. As such, each of the plurality of nodes is instructed (e.g., by the MME or another node) to utilize the primary trace processor for the trace reports. Based on the instruction, the primary trace processor subsequently receives a plurality of trace reports. The plurality of trace reports may be stored within the master set of trace reports.

In embodiments, one or more of the trace reports 418 received may be stored at the trace profile for each UE, which may be maintained and updated by the primary trace processor. In some embodiments, the primary trace processor maintains each UE's trace profile by organizing the trace reports 418 based on a particular node. In some embodiments, each trace profile may be organized based on a timestamp associated with UE location data 410. As depicted in example trace report 418, a trace report may include a trace report trigger 420, trace report data 422, and a trace report label 424. In some embodiments, the trace report 418 includes more or less features than those depicted in example trace report 418.

The trace report trigger 420 may include data associated with the initiation of the generation of a trace report. One example trace report trigger 420 may include a connection setup between a UE and a node. Another trace report trigger 420 may include an event wherein the UE moves from the coverage area of one node to the coverage area of another node. As another example, the trace report trigger 420 may include an outgoing telephone call from the UE, an incoming telephone call from the UE, or initiation of an idle mode for the UE. The trace report data 422 may include, for example, data associated with a telephone call, data associated with a text message, data associated with an Wi-Fi connection, data associated with a handover, data associated with signal strength, UE identification data, UE location data, node identification data, other types of data corresponding to the UE and a respective node, or a combination thereof.

Further, the trace report label 424 may include one or more labels for the trace report trigger 420 or trace report data 422, such that the primary trace processor can organize trace reports and extract data from the trace reports in an effective manner. For example, the trace report label 424 may be in a standardized format for each of the trace reports. The trace report label 424 may be used to identify or organize, for example, UE identification data, UE location data, or associated node data. In some embodiments, the trace report label 424 represents an XML object or other data structure.

As an example, the primary trace processor may receive an instruction to identify a most recent location of the first UE (e.g., from a second UE). Based on this instruction, the primary trace processor may identify (e.g., using the trace report label 424 or a timestamp) the most recent location of the first user equipment based on the master set of trace reports for the first UE. Accordingly, the primary trace processor may transmit data corresponding to the most recent location (e.g., a latitude and longitude) of the first UE to the second UE associated with the instruction to identify the most recent location of the first UE.

In some embodiments, the primary trace processor transmits one or more trace reports or data from a trace report that was received by the primary trace processor from the same node or from a different node. For example, the primary trace processor may identify the first node as a node that is most frequently used by a first UE (e.g., a home node or a work node). Upon receiving the indication to utilize the primary trace processor for trace reports associated with the first UE, the primary trace processor may receive a plurality of trace reports from the first node, such as a first trace report, a second trace report, and a third trace report. As one example, the primary trace processor may transmit session data of the second trace report back to the first node at a future time or to another node in which the first UE is currently using a communication service.

Figure 5:
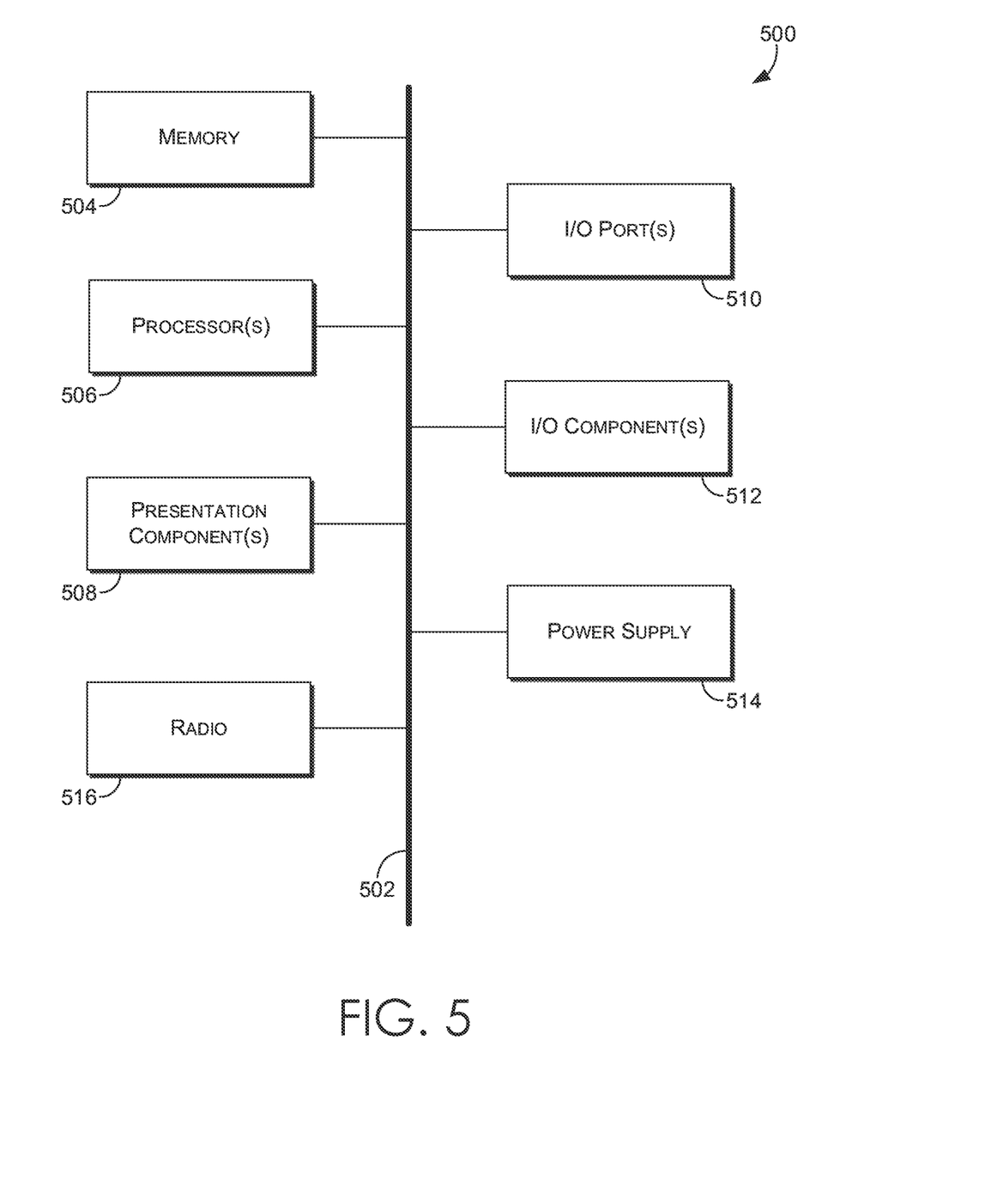
FIG. 5 depicts an exemplary computing environment suitable for use in implementations of the present disclosure, in accordance with aspects herein.

Turning now to FIG. 5, a diagram is depicted of an exemplary computing environment suitable for use in implementations of the present disclosure. In particular, the exemplary computer environment is shown and designated generally as UE/user device 500. User device 500 is but one example of a suitable computing environment and is not intended to suggest any limitation as to the scope of use or functionality of the invention. Neither should user device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

User device 500 may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device that communicates via wireless communications to interact with a public or private network.

In aspects, user device 500 may be configured to communicate using telecommunications network services providing 3G, 4G (e.g., LTE), 5G, 6G, other generations, or a combination thereof. For example, the user device 500 comprises components capable of establishing a 5G connection with a 5G gNB to be served according to 5G over that connection. In some aspects, user device 500 is an E-UTRAN New Radio—Dual Connectivity (ENDC) device that allows user device 500 to connect to an LTE eNB that acts as a master node and a 5G gNB that acts as a secondary node. Continuing the example, the ENDC device may access both LTE and 5G simultaneously, and in some cases, on the same spectrum band.

With continued reference to FIG. 5, user device 500 includes bus 502 that directly or indirectly couples the following devices: memory 504, one or more processors 506, one or more presentation components 508, input/output (I/O) port(s) 510, I/O component(s) 512, power supply 514, and radio(s) 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O component(s) 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "user device."

User device 500 typically includes a variety of computer-readable media. Computer-readable media can be any available media that can be accessed by user device 500. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 504, memory 504 includes computer-storage media in the form of volatile or nonvolatile memory. Memory 504 may be removable, nonremovable, or a combination thereof. Examples of memory 504 include solid-state memory, hard drives, optical-disc drives, etc. For instance, memory 504 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 506, the one or more processors 506 read data from various entities such as bus 502, memory 504 or I/O component(s) 512. The one or more processors 506 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 506 execute instructions, for example, of an Operating System of the user device 500 or of one or more suitable applications.

Further, the one or more presentation components 508 present data indications to a person or other device. Examples of one or more presentation components 508 include a display device, speaker, printing component, vibrating component, etc. Additionally, I/O port(s) 510 allow user device 500 to be logically coupled to other devices including I/O component(s) 512, some of which may be built in user device 500. Illustrative I/O component(s) 512 include a microphone, joystick, game pad, satellite dish, scanner, printer, wireless device, etc. Furthermore, power supply 514 may include any suitable source of power, such as a rechargeable lithium polymer battery or an alternating current power converter.

Turning to radio 516, the radio 516 facilitates communication with a wireless telecommunications network. For example, radio 516 may facilitate communication via wireless communication signals, RF signals, frames, blocks, transmission streams, packets, messages, data items, or data. The terms "radio," "controller," "antenna," and "antenna array" are used interchangeably to refer to one or more software and hardware components that facilitate sending and receiving wireless radio-frequency signals, for example, based on instructions from a cell site. Radio 516 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, or apertures, or any combination thereof. The antennas may be capable of sending and receiving transmission via millimeter waves, FD-MIMO, massive MIMO, 3G, 4G, 5G, or 802.11 protocols and techniques, etc.

Illustrative wireless telecommunications technologies that radio 516 may facilitate include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies or multiple radios can be utilized to support multiple technologies.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:
1. A computerized method for dynamic session trace management for user equipment, the method comprising:
identifying a first node corresponding to a first user equipment, wherein the first node is associated with a default trace processor;

requesting, from a profile store, a trace profile for the first user equipment, the trace profile indicating a primary trace processor for the first user equipment;

determining, based at least in part on the trace profile for the first user equipment, that the primary trace processor is different than the default trace processor of the first node; and instructing the first node to utilize the primary trace processor for trace reports associated with the first user equipment such that the primary trace processor maintains a master set of trace reports for the first user equipment for locating the first user equipment.

2. The computerized method of claim 1, further comprising:

identifying a plurality of nodes corresponding to the first user equipment, each of the plurality of nodes associated with a session trace processor;

instructing each of the plurality of nodes to utilize the primary trace processor for the trace reports associated with the first user equipment;

receiving, from the plurality of nodes, a plurality of trace reports for the first user equipment; and storing the plurality of trace reports within the master set of trace reports.

3. The computerized method of claim 2, further comprising:

receiving an instruction to identify a most recent location of the first user equipment;

identifying, by the primary trace processor, the most recent location of the first user equipment based on the master set of trace reports for the first user equipment; and transmitting, by the primary trace processor, data corresponding to the most recent location of the first user equipment to a second user equipment associated with the instruction to identify the most recent location of the first user equipment.

4. The computerized method of claim 3, wherein the data corresponding to the most recent location comprises a latitude and longitude and a time stamp.

5. The computerized method of claim 1, wherein the first node is a radio access node, and wherein at least one trace report of the master set of trace reports is received by the primary trace processor over a core network.

6. The computerized method of claim 1, wherein the trace profile comprises session data corresponding to communication sessions between the first user equipment and a plurality of nodes, the plurality of nodes comprising the first node and a second node associated with a second trace processor.

7. The computerized method of claim 1, further comprising:

identifying a second node corresponding to the first user equipment, the second node associated with a second processor;

instructing the second node to utilize the primary trace processor for the trace reports associated with the first user equipment;

receiving, at the primary trace processor and from the second node, a trace report for the first user equipment; and providing, via the primary trace processor, the trace report to the first node.

8. A dynamic session trace management system comprising:

one or more processors; and computer memory storing computer-usable instructions that, when executed by the one or more processors, perform operations comprising:

requesting a trace profile for a first user equipment, the trace profile stored at a profile store;

based on the trace profile for the first user equipment, providing an indication to a first node having a default trace processor that a primary trace processor maintains trace reports for the first user equipment; and receiving, at the primary trace processor and from the first node, a first trace report for the first user equipment for transmission by the primary trace processor to a second node or back to the first node at a future time.

9. The system of claim 8, further comprising providing an indication to the second node that the primary trace processor maintains the trace reports for the first user equipment, the indication to the second node provided based on a connection setup between the first user equipment and the second node.

10. The system of claim 9, further comprising receiving, by the primary trace processor and from the first node and the second node, additional trace reports for the first user equipment based on the indication that the primary trace processor maintains the trace reports.

11. The system of claim 10, further comprising:

storing, at the profile store, the first trace report and the additional trace reports within the trace profile for the first user equipment;

receiving an instruction to identify a most recent location of the first user equipment;

identifying, by the primary trace processor, the most recent location of the first user equipment based on the trace profile comprising the first trace report and the additional trace reports; and transmitting data corresponding to the most recent location of the first user equipment to a second user equipment associated with the instruction to identify the most recent location of the first user equipment.

12. The system of claim 9, further comprising:

receiving, by the primary trace processor and from the second node, a second trace report;

storing the second trace report within the trace profile at the profile store; and transmitting session data of the second trace report to the first node.

13. The system of claim 12, further comprising:

receiving, by the primary trace processor and from the first node, a third trace report for the first user equipment to store at the profile store; and transmitting, by the primary trace processor, the third trace report to the second node.

14. Non-transitory computer-readable media having computer-usable instructions embodied thereon that, when executed by a processor, perform operations for dynamic session trace management for user equipment, the operations comprising:

identifying a first node that is most frequently used by a first user equipment, the first node associated with a first trace processor;

identifying a second node associated with the first user equipment, the second node associated with a second trace processor;

instructing the first node and the second node to utilize a primary trace processor that manages trace reports corresponding to the first user equipment; and based on instructing the first node and the second node, receiving, by the primary trace processor, a trace report from the first node or the second node for the first user equipment.

15. The non-transitory computer-readable media of claim 14, wherein the first node and the second node are identified by using a trace profile for the first user equipment that comprises identification data for identifying the first user equipment upon the first user equipment establishing a communication session with a node.

16. The non-transitory computer-readable media of claim 14, wherein the trace report is received from the first node, and wherein the operations further comprise:
receiving, by the primary trace processor, a second trace report for the first user equipment from the second node;
storing a trace profile for the first user equipment at a profile store, the trace profile comprising the trace report and the second trace report; and
transmitting, by the primary trace processor, data from the trace profile to the first node or the second node.

17. The non-transitory computer-readable media of claim 14, the operations further comprising storing a trace profile for the first user equipment at a profile store, the trace profile comprising a plurality of trace reports from the first node and a plurality of nodes identified for the first user equipment based on historical communication sessions, the trace profile being accessible by the primary trace processor.

18. The non-transitory computer-readable media of claim 17, the operations further comprising:
receiving an instruction to identify a most recent trace report for the first user equipment;
identifying, by the primary trace processor, the most recent trace report for the first user equipment based on the trace profile; and
transmitting the most recent trace report to a second user equipment associated with the instruction to identify the most the most recent trace report.

19. The non-transitory computer-readable media of claim 17, wherein one of the plurality of nodes is identified based on a mobility management entity receiving, from one of the plurality of nodes, a setup message associated with the first user equipment.

20. The non-transitory computer-readable media of claim 14, wherein the trace report is received by the primary trace processor from the first node and transmitted to the second node.

\* \* \* \* \*